Oct. 20, 1964 R. B. UPHOFF 3,153,763

DIODE SWITCHING CIRCUIT FOR SELECTIVELY APPLYING PLURAL SYMBOL-FORMING SIGNALS TO CRT INDICATOR SEQUENTIALLY IN PREDETERMINED POSITIONS

Original Filed Aug. 29, 1960 4 Sheets-Sheet 1

INVENTOR.
FRANK B. UPHOFF

DIODE SWITCHING CIRCUIT FOR SELECTIVELY APPLYING PLURAL SYMBOL-FORMING SIGNALS TO CRT INDICATOR SEQUENTIALLY IN PREDETERMINED POSITIONS

Original Filed Aug. 29, 1960 4 Sheets-Sheet 2

INVENTOR.
FRANK B. UPHOFF

INVENTOR.
FRANK B. UPHOFF

*INVENTOR.*
FRANK B. UPHOFF 3,153,763

DIODE SWITCHING CIRCUIT FOR SELECTIVELY APPLYING PLURAL SYMBOL-FORMING SIGNALS TO CRT INDICATOR SEQUENTIALLY IN PREDETERMINED POSITIONS

Frank B. Uphoff, Bustleton Pike, Churchville, Pa.

Original application Aug. 29, 1960, Ser. No. 52,748. Divided and this application Nov. 30, 1962, Ser. No. 241,449
5 Claims. (Cl. 328—97)
(Granted under Title 35, U.S. Code (1952), sec. 266)

The invention described herein may be manufactured and used by or for the Government of the United States of America for governmental purposes without the payment of any royalties thereon or therefor.

This application is a division of application Serial No. 52,748, filed August 29, 1960, for Symbol Wave Form Generator.

The present invention relates generally to a symbol waveform generator. More particularly, the invention relates to a symbol element selector circuit operable to sequentially apply a plurality of symbol forming signals to a cathode ray tube indicator during the sweep retrace interval therefor.

This invention is particularly advantageous when applied to a radar indicator of the type wherein provision is made to utilize the sweep retrace interval to display various types of desired information. This type of indicator operation is called retrace insertion. A radar indicator system of the type mentioned is described in copending application Serial No. 18,774 of William F. Lyons, Jr., filed March 30, 1960, for Retrace Insertion System.

The development of retrace insertion techniques has made possible the display of a plurality of positionable dot or circle markers on radar type indicators during the retrace interval in a manner fully explained in the above referenced copending application. The ability to present positionable markers electronically has greatly extended the usefulness of such an indicator. Controllable dot or circle markers are used to represent targets, aircraft, ships, sonobuoys, and other parameters related to the tactical problem being displayed. The marker position and motion is analogous to location, course, and speed of the objects represented.

It is obvious that this development has not only increased the versatility of tactical displays but that the quantity of data presented to the operator places greatly increased demands on his capabilities and mental efficiency. This burden can be reduced by providing a system capable of generating unique symbols (to serve as markers) which enable the operator to rapidly discriminate between them with regard to their meaning in the problem. The present invention was developed to provide the necessary waveforms needed to generate the required identifying symbols.

The extent and complexity required of symbol generating circuits utilized in an indicating system of the character described are mainly determined by the timing requirements of retrace insertion. The symbol waveforms must be generated and applied to the indicator during the very short time interval available between successive sweeps remaining after allowance is made for the time interval which must be allotted to permit recovery of the indicator deflection and control circuitry. The time interval available for retrace insertion may, for example, be on the order of between ten and eighty microseconds. Thus, the symbol forming waveforms must be generated and accurately synchronized to occur precisely during the brief available portion of the retrace interval. In addition, wherein it is desired, as in the present invention, to provide a plurality of uniquely configured symbols, there must be provided a switching function operable to select and apply to the indicator system in sequence a plurality of waveforms operable to generate the desired distinctive symbols. This feature makes possible the unique identification of the various parameters displayed on the indicator as may be required by the tactical problem under consideration.

Known symbol waveform generators adaptable for use with cathode ray tube indicators employing retrace insertion are characterized by being incapable of generating distinctively configured symbols, by being too complex and bulky, and by not being compatible with the timing requirements of retrace insertion.

The manner in which the present invention overcomes the above mentioned difficulties will become apparent upon consideration of the detailed description of illustrative embodiments thereof which are given below.

It is a principal object of the present invention to provide a symbol element selector circuit operable to sequentially apply to a cathode ray tube indicator a plurality of distinctly characterized symbol forming signals.

It is another object of the present invention to provide a diode switching circuit operable to select and apply a plurality of distinctly characterized symbol forming signals to a cathode ray tube indicator sequentially in predetermined positions.

Other objects and many of the attendant advantages of this invention will be readily appreciated as the same becomes better understood by reference to the following detailed description when considered in connection with the accompanying drawings in which like reference numerals designate like parts throughout the figures thereof and wherein:

FIG. 1 shows in block diagram form a portion of the display indicator circuitry of a radar system, other portions of which are not shown.

Figure 1:
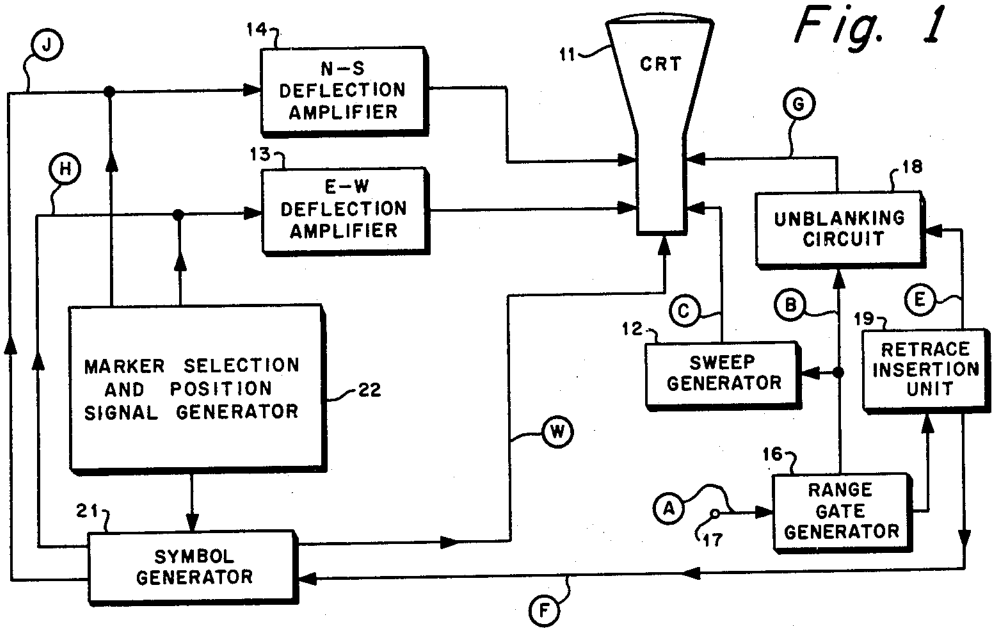
FIG. 1 is a schematic representation of a portion of a cathode ray tube indicating system which includes provision for retrace insertion illustrating generally the manner in which the present invention may be employed.

The display indicator circuitry may include a cathode ray tube 11 provided with conventional video circuitry, not shown. Cathode ray tube 11 is provided with a linear sawtooth sweep generator 12 which, while not so shown, may be coupled through a pair of deflection amplifiers 13, 14 to the beam deflection elements of cathode ray tube 11. The linear sawtooth is indicated upon the occurrence of a range gate signal applied to the sweep generator from a range gate generator 16 and is terminated upon termination of the range gate. The duration of the range gate is, of course, selected to accord with the desired range scale of the indicator and is initiated upon the occurrence of the radar system trigger applied to the range gate generator from a terminal 17. The range gate signal from range gate generator 16 is further coupled to an unblanking circuit 18 which thereupon functions to provide a beam intensifying signal coupled to an appropriate element of cathode ray tube 11 to permit display of data acquired during the range sweep. The system trigger, linear sweep voltage, and the range gate signal are respectively illustrated by waveforms A, B, and C in FIG. 2 wherein all waveforms are plotted on a common time base to facilitate analytic comparison of the waveforms shown.

As will be more fully explained below, provision is made to modify the unblanking signal from the unblanking circuit 18 to permit display of symbols during the sweep retrace interval.

The waveforms needed to permit retrace insertion of symbol generating signals are provided by a retrace insertion unit 19 coupled to be energized by the range gate signal from range gate generator 16.

Upon termination of the range gate, retrace insertion unit 19 functions to simultaneously generate a symbol generator enabling gate and a delay pulse, the latter having a duration sufficient to permit recovery of the deflection and control circuitry of the indicator following termination of the normal sweep.

Retrace insertion unit 19 further functions upon termination of the delay pulse to generate a brightening pulse coupled to unblanking circuit 18. A pentode mixer or equivalent circuit may preferably be included in unblanking circuit 18 to permit the generation of an unblanking signal to be coupled to cathode ray tube 11 which is the composite of the range gate signal from range gate generator 16 and the brightening pulse from retrace insertion unit 19. As may be apparent, the composite unblanking signal not only permits display of data during the normal sweep interval of the indicator but further permits display of additional data during the portion of the retrace interval within which the brightening pulse occurs and persists.

Figure 2:
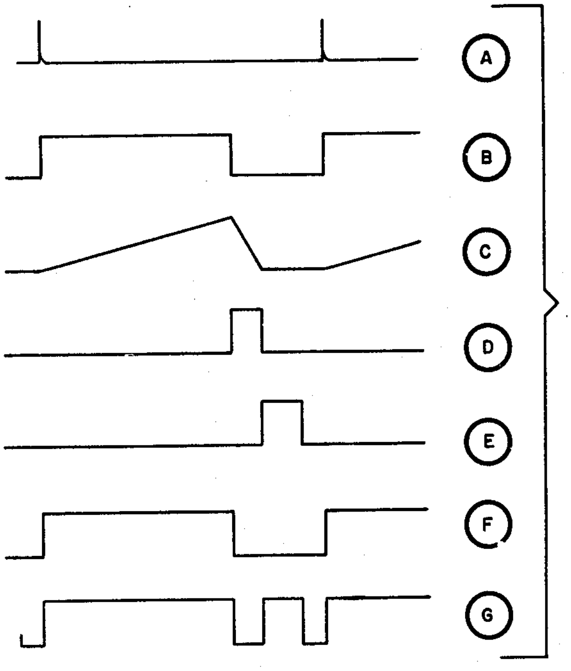
FIG. 2 illustrates certain waveforms occurring in the system of FIG. 1.

The delay pulse brightening pulse, and symbol generator enabling gate, all provided by retrace insertion unit 19, are respectively shown by waveforms D, E and F in FIG. 2 while the composite unblanking signal from unblanking circuit 18 is shown by waveform G in FIG. 2.

Where it is desired to utilize common deflection and video circuitry to permit successive display and orientation of data acquired during the sweep interval as well as data to be displayed during the retrace interval, switching means may be provided that is operable to select between normal and retrace input channels to the video and deflection circuitry. The switching means may be controlled by switching gates provided by retrace insertion unit 19.

For a more complete discussion of the circuitry described above reference may be had to copending application Serial No. 18,774, filed March 30, 1960.

According to the invention, symbol signal generator 21 is of the type which operates to provide symbol element forming signals. Symbol element selection circuitry is included within symbol signal generator 21 and is controlled by symbol configuration selection signals from a symbol selection and position signal generator 22 which further functions to provide symbol positioning signals that are coupled to deflection amplifiers 13, 14.

As may be seen by reference to FIG. 3, the symbols to be generated in accordance with the present invention comprise a plurality of circles the peripheries of which may be distinctively intensity or deflection modulated by a chain of video pulses in a manner which will be more fully understood upon consideration of the detailed description of illustrative embodiments of the invention which are given below. It is to be understood that, in a contemplated use of the invention, the symbols are generated in sequence as they appear from left to right in FIG. 3. Other sequences are, of course, possible should this be desired. Referring now to FIG. 4, which in block diagram form illustrates an embodiment of symbol generator 21 shown generally in FIG. 1, there is shown a pulsed sine wave oscillator 30 having an input circuit thereof coupled to a terminal 25 to receive the enabling gate from retrace insertion unit 19 (FIG. 1).

As will be more apparent as the description of FIG. 4 is continued, sine wave oscillator 30 provides the basic waveform utilized in the symbol generator to provide for the generation of all modulating waveforms.

In considering the description of FIG. 4 below, reference should also be made to FIG. 5 which illustrates various waveforms occurring in the embodiment of FIG. 4. All waveforms shown in FIG. 5 are plotted on a common time base and are referenced to the composite unblanking waveform G shown in FIG. 2 and again, for convenience, in FIG. 5. It will be apparent as the description proceeds that the apparatus of FIG. 4 is synchronized with respect to the operation of retrace insertion unit 19 whereby all symbol forming signals are generated during the persistence of brightening pulse E and are properly phased therewith to permit generation of symbols in a selected sequence (see FIG. 3).

The sine wave output signal from oscillator 30 is coupled to a phase shifter 40 which operates to shift the phase of the input signal ninety degrees to provide both sine wave and cosine wave output signals which are respectively coupled to a pair of cathode follower circuits 50, 50*a*. The sine and cosine output signals from cathode followers 50, 50*a*, shown by waveforms H and J in FIG. 5, are respectively coupled to the East-West and North-South deflection amplifiers 13, 14 (FIG. 1). As is well known in the art, the amplified sine and cosine signals from deflection amplifiers 13, 14 when applied to the deflection elements of cathode ray tube 11 are operable to generate on the screen thereof a Lissajous circle. As will be explained more fully below in connection with the description of FIG. 6, the Lissajous circle may be oriented in accordance with positioning voltages coupled through the deflection amplifiers 13, 14 from symbol selection and position signal generator 22.

The sine and cosine signals from phase shifter 40 are further coupled to the input circuits of a pair of cathode follower circuits 60, 60*a*, the output signals from which are coupled to a pair of wave shaping amplifiers 70, 70*a* which function to convert the sinusoidal input signals to square wave output signals of commensurate phase and frequency, as may be seen by reference to waveforms K and L of FIG. 5.

Differentiator circuits 80, 80*a* convert the square wave signals to pulse chains comprising alternating positive and negative spikes occurring in time coincidence with the zero passages of the square waves, as may be seen by reference to waveforms M and N of FIG. 5.

The pulse chain from differentiators 80, 80*a* are respectively coupled through amplifiers 90, 90*a* and cathode followers 100, 100*a* to blocking oscillators 110, 110*a*. Waveforms M' and N', designating the input signals to blocking oscillators 110, 110*a*, are identical to waveforms M and N except for one hundred and eighty degree phase reversals which occur respectively in amplifiers 90, 90*a*. Accordingly, waveforms M' and N' are not separately illustrated in FIG. 5.

Blocking oscillators 110, 110*a* function in a conventional manner to provide high intensity positive pulses coinciding in time with the application of positive pulses to the input circuits thereof, as may be seen by reference to waveforms Q and R of FIG. 5. Since the input sine and cosine signals to the channels described are ninety degrees phase displaced, the positive pulses occurring respectively in pulse chains Q and R are also phase displaced with respect to each other by ninety electrical degrees.

The output signals from amplifiers 90, 90*a* are further coupled through a pair of amplifier inverters 130, 130*a* and cathode followers 140, 140*a* to a second pair of blocking oscillators 150, 150*a* which function as described above to provide two additional pulse chains illustrated by waveforms P and S in FIG. 5. The input signals to blocking oscillators 150, 150a, shown by waveforms M and N in FIG. 5, are displaced one hundred and eighty degrees from the input signals applied to blocking oscillators 110, 110a and are phase displaced ninety degrees from each other.

Thus blocking oscillators 110, 110a, 150, and 150a together provide a positive pulse for each ninety degrees of the basic sine wave signal as may be seen by comparison of waveforms H, P, Q, R, and S in FIG. 5. It will by further reference to waveforms G and J also be observed that one complete cycle of the sine and cosine waves as well as four ninety degree phase displaced video pulses all occur during the persistence of the brightening pulse generated in retrace insertion unit 19 (FIG. 1).

As will be more fully explained below in connection with the description of FIG. 6, symbol element selector circuit 200 in response to any of a plurality of enabling gates from symbol selection and position signal generator 22 (FIG. 1) functions to couple the output of selected ones of blocking oscillators 110, 110a, 150, and 150a to a terminal 300 for application to the video input or deflection circuitry of cathode ray tube 11 depending upon whether it is desired to intensity modulate or deflection modulate the periphery of the Lissajous circle generated upon the face of cathode ray tube 11 by application thereto through deflection amplifiers 13, 14 of the sine and cosine outputs from cathode followers 50, 50a. Waveform W in FIG. 5 illustrates the video pulse output coupled to terminal 300 when symbol element selector circuit 200 is placed in condition to pass the output signals from all of the blocking oscillators. Symbol 9 (FIG. 3) will be generated by the above mentioned combination of symbol element forming signals.

Figure 3:
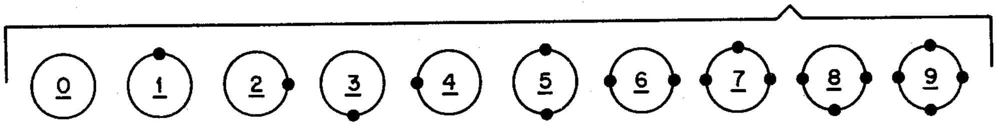
FIG. 3 illustrates the distinctively configured symbols which may be generated by operation of embodiments of the present invention.
Figure 4:
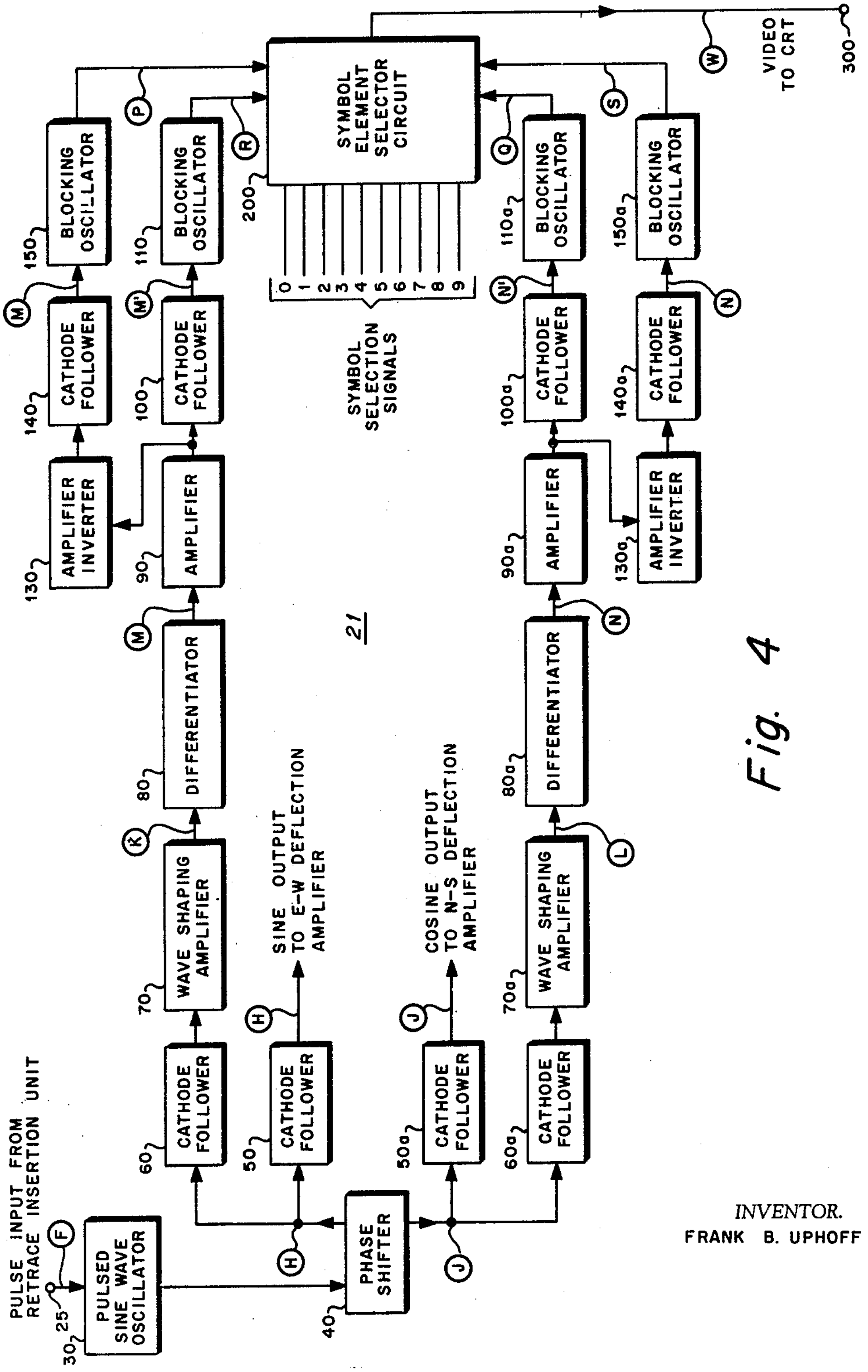
FIG. 4 is a block diagram of an embodiment of a symbol waveform generator incorporating the present invention.
Figure 5:
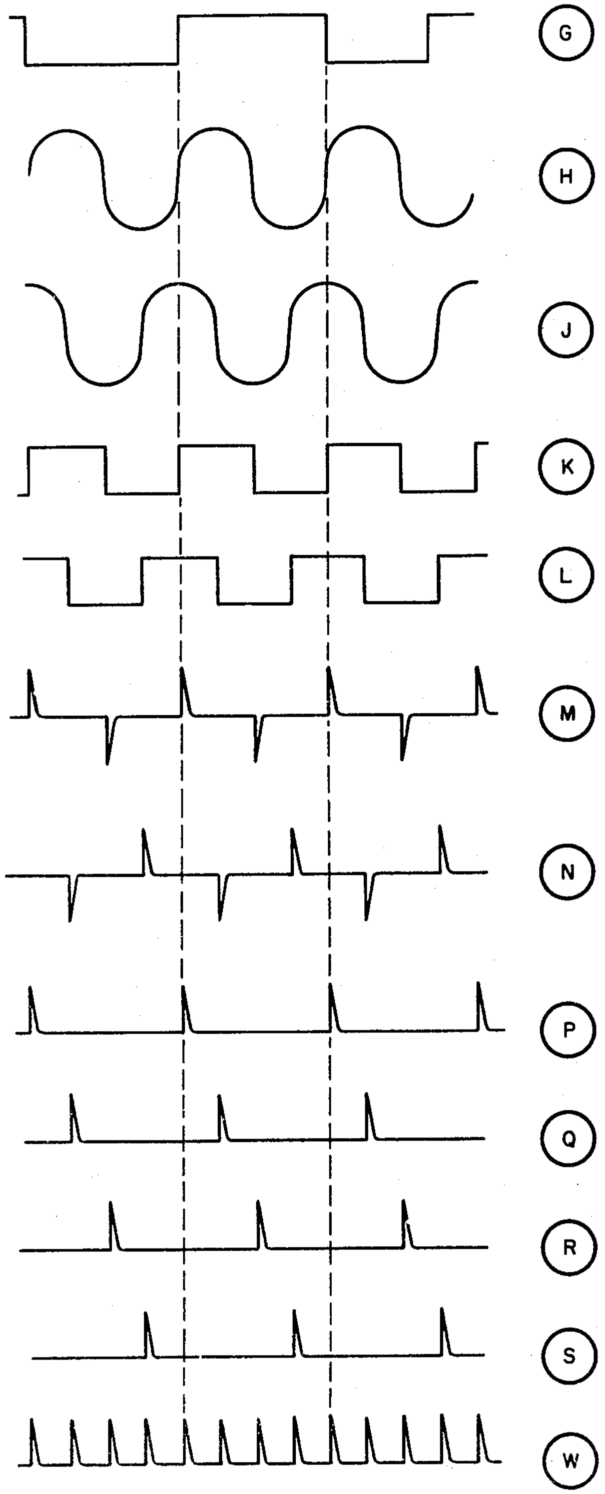
FIG. 5 illustrates a plurality of waveforms occurring in the embodiment of FIG. 4 and occurring in part in the system of FIG. 1.
Figure 6:
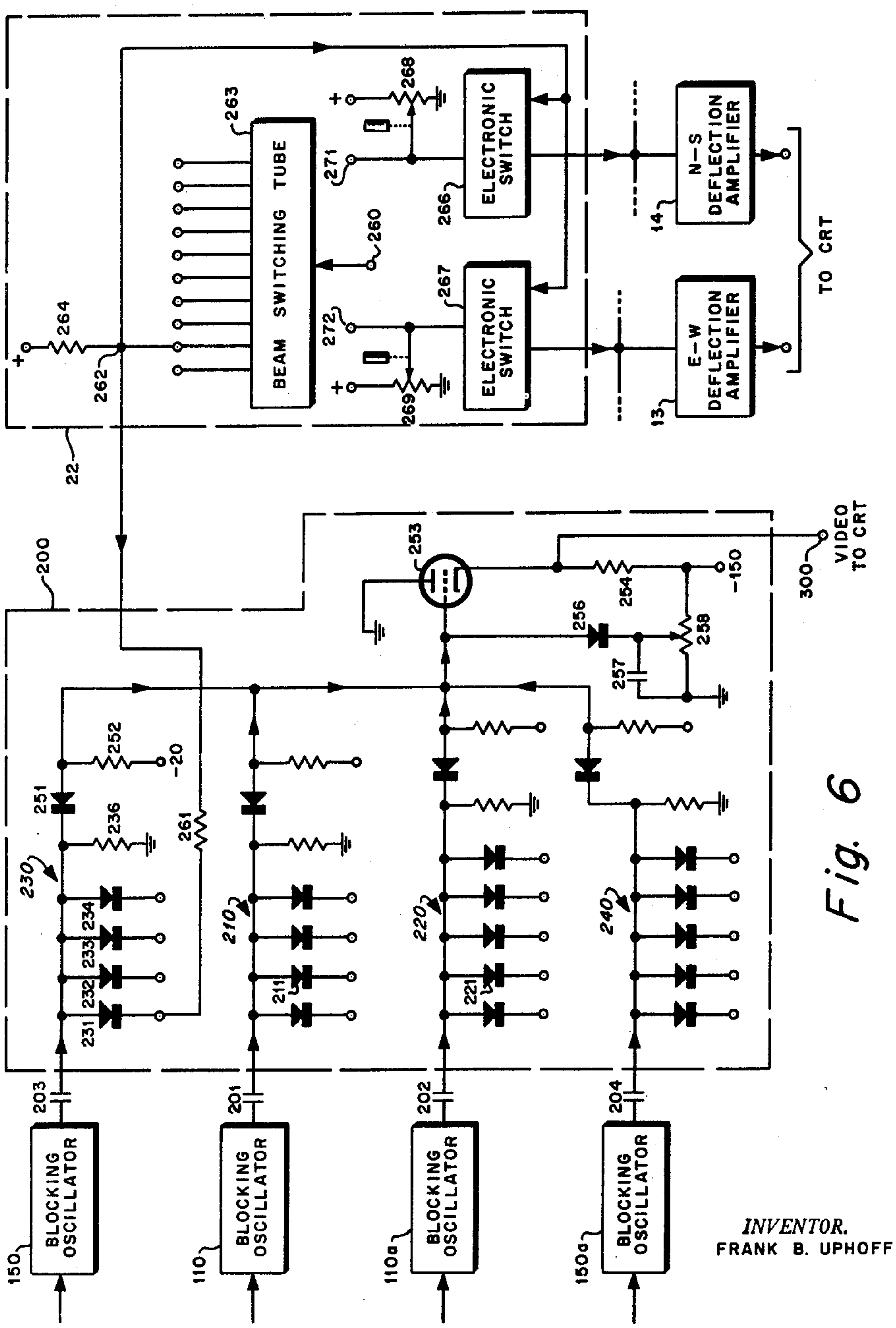
FIG. 6 illustrates partly in circuit diagram form and partly in block diagram for a preferred embodiment of the symbol element selector circuit of the present invention.

The manner in which the appropriate symbol element signals may be selected in order to provide for the generation of a desired symbol may be best understood by reference to FIG. 6 which illustrates partly in block diagram form and partly in circuit diagram form embodiments of the symbol selector and position signal generator and the symbol element selector circuit respectively shown generally in FIGS. 3 and 4.

Referring now to FIG. 6, it will be seen that blocking oscillators 110, 110a, 150 and 150a are respectively coupled through capacitors 201, 202, 203 and 204 to diode networks 210, 220, 230, and 240. Diode network 230, which has been selected for further discussion, comprises a plurality of diodes 231, 232, 233, 234 and a grounded resistor 236. The anodes of diodes 231 through 234 and the ungrounded terminal of resistor 236 are coupled in common to the cathode of a diode 251.

Diode networks 210, 220 and 240 are similarly constructed and will not be described in detail.

The anode of diode 251 is coupled through a resistor 252 to a negative bias voltage and to the grid of a triode 253 which together with cathode resistor 254 comprises a cathode follower circuit.

The grid of triode 253 is further coupled to ground through a network comprising diode 256, capacitor 257 and a portion of potentiometer 258 for a purpose to be later described.

The cathode of diode 231 is coupled through a resistor 261 to a terminal 262 which is coupled to a target of beam switching tube 263. The target is connected through a target resistor 264 to a source of positive potential and is further coupled to the control input circuits of a pair of electronic switches 266, 267. A terminal 260 is connected to the control element of beam switching tube 263 and is adapted to be coupled to receive the radar system trigger.

The signal input circuits of electronic switches 266, 267 are respectively coupled to the wiper arms of a pair of potentiometers 268, 269. The wiper arms of potentiometers 268, 269 which may be manually operable, are further coupled to a pair of terminals 271, 272 which may, if desired, be coupled to computer or storage circuit, not shown.

The output circuits of electronic switches 266, 267 are respectively coupled to North-South and East-West deflection amplifiers 13, 14 (FIG. 1).

As is understood in the art, each time a trigger is applied to terminal 260 the electron beam in beam switching tube 263 is shifted to the next succeeding target. For purposes of the present discussion it is assumed that beam switching tube 263 has been stepped to the second position.

In the quiescent condition of the circuitry shown in FIG. 6, diode 251 is cut off by the negative bias applied to the anode thereof whereby pulses appearing at the output of the blocking oscillators are isolated from the grid of triode 253 and thus do not appear in the output circuit thereof. However, when the beam switching tube 263 has been stepped to the position indicated, the negative potential appearing at terminal 262 (relative to the diode bias voltage) is coupled to the cathode of diode 231 in diode network 230. The resultant conduction through diode 231 and resistor 236 places a negative potential upon the cathode of diode 251 having a magnitude greater than the negative potential applied to the anode thereof, thus permitting the pulses which appear in the output circuit of blocking oscillator 150 to be coupled through diode 251 to the grid of triode 253 and to thereupon appear at the output circuit thereof to be coupled to cathode ray tube 11 (FIG. 1). There will thus be generated on the face of cathode ray tube 11 a symbol comprising a circle having an intensity modulated dot appearing on the periphery thereof in the North position (see symbol 1, FIG. 3). Operation of the wiper arms of potentiometers 268, 269 functions to position the symbol upon the face of the cathode ray tube as desired. If, as mentioned above, potentiometer wiper terminals 271, 272 are coupled to computer or storage circuits, the position voltages may be further utilized to perform any desired analytic function, for example, computing an intercept point.

Unfortunately, all commercially available diodes have some shunt capacitance. Accordingly, it is not possible to completely isolate triode 253 from the blocking oscillators in the absence of an enabling signal from beam switching tube 263 as desired. The network comprising diode 256, capacitor 257, and potentiometer 258 is therefore provided to by-pass undesired leak through signals.

In the preferred mode of operation of the present invention, as mentioned above, the symbols shown in FIG. 3 are sequentially generated in the order that they appear in FIG. 3 looking from left to right.

By way of further example, accordingly, in the generation of a positionable symbol comprising a circle having dots intensity modulated on the periphery thereof in the East and West positions (symbol 6, FIG. 3), the eighth target of beam switching tube 263 may be coupled to the cathodes of diodes 211 and 221 of diode networks 210, 220, respectively, and to electronic switch circuits similar to those described above.

It should be noted that in providing for the generation of the first symbol, the unmodulated circle, the first target of 263 is not coupled to the diode networks but only to electronic switch circuits similar to those described above. It should further be noted that a diode must be provided for each time a dot position occurs in the sequential generation of the symbols. Thus, diode network 230 which provides for the generation of North position dots includes four diodes while diode network 240 which provides for the generation of West position dots includes five diodes.

Obviously many modifications and variations of the present invention are possible in light of the above teachings. It is therefore to be expressly understood that within the scope of the appended claims the invention may be practiced otherwise than as specifically described.

What is claimed is:

1. A diode switching network, comprising in combination:

first diode means, a source of positive pulses, a plurality of second diode means, conductor means commonly connecting said source of positive pulses to the plates of each of said plurality of second diode means and the cathode of said first diode means, resistor means connecting the cathode of said first diode means to ground, voltage source means connected to the plate of said first diode means biasing said first diode means to isolate said positive pulses, bias means selectively connectable to any one of the cathodes of said plurality of second diode means, whereby said first diode means is made to conduct said positive pulses.

2. A diode switching network, comprising in combination:

first diode means, a source of positive pulses, a plurality of second diode means, conductor means commonly connecting said source of positive pulses to the plates of each of said plurality of second diode means and the cathode of said first diode means, resistor means connecting the cathode of said first diode means to ground, voltage source means connected to the plate of said first diode means biasing said first diode means to isolate said positive pulses, cathode follower means, said cathode follower means comprising a triode having a plate, grid, cathode and cathode resistor means electrically connecting the grid of said triode to the plate of said first diode means, bias means selectively connectable to any one of the cathodes of said plurality of second diode means making said first diode means conductive, whereby a positive pulse appears across said cathode resistor for each of said positive pulses occurring during the conductive period of said first diode means.

3. A diode switching network, comprising in combination:

a plurality of diode switching circuits, each of said plurality of diode switching circuits comprising, first diode means, a plurality of second diode means, conductor means commonly connecting the plates of each of said plurality of second diode means to the cathode of said first diode means, resistor means connecting the cathode of said first diode means to ground, voltage source means connected to the plate of said first diode means biasing said first diode means nonconductive, a plurality of sources of positive pulses connected to the cathode of said first diode means of each of said plurality of diode switching circuits, output terminal means connected to the plate of said first diode means of each of said plurality of diode switching circuits, a plurality of bias means selectively connectable to any one of the cathodes of said plurality of second diode means of each of said plurality of diode switching circuits, whereby each of said sources of positive pulses may be connected to said output terminals individually or in selected combinations.

4. A diode switching network, comprising in combination:

a plurality of diode switching circuits, each of said plurality of diode switching circuits comprising, first diode means, a plurality of second diode means, conductor means commonly connecting the plates of each of said plurality of second diode means to the cathode of said first diode means, resistor means connecting the cathode of said first diode means to ground, voltage source means connected to the plate of said first diode means biasing said first diode means nonconductive, a plurality of sources of positive pulses connected to the cathode of said first diode means of each of said plurality of diode switching circuits, cathode follower means, said cathode follower means comprising a triode having a plate, grid, cathode and cathode resistor, means electrically connecting the grid of said triode to the plate of said first diode means of each of said plurality of diode switching circuits, a plurality of bias means selectively connectable to any one of the cathodes of said plurality of said second diode means of said plurality of diode switching circuits, whereby any positive pulses from any of said sources of positive pulses which occurs during the conductive period of said first diode means of each of said diode switching circuit appears across said cathode resistor.

5. A diode switching network comprising:

an input terminal coupled to a signal source;

a first diode having one element thereof coupled to said input terminal and the other element thereof coupled to a source of bias potential making said first diode nonconductive, a output terminal coupled to a utilization means, circuit means coupling said output terminal to the other element of said first diode, a plurality of diodes each having one corresponding element thereof coupled to said one element of said first diode, and means operable to selectively apply conduction enabling potential to the other elements of said plurality of diodes.

References Cited in the file of this patent

UNITED STATES PATENTS 2,762,936 Forrest ---------------- Sept. 11, 1956